(12) United States Patent
Höchsmann et al.

(10) Patent No.: US 11,524,454 B2
(45) Date of Patent: Dec. 13, 2022

(54) COATER ARRANGEMENT FOR A 3D PRINTER

(71) Applicant: ExOne GmbH, Gersthofen (DE)

(72) Inventors: Rainer Höchsmann, Langenneufnach (DE); Alexander Müller, Diedorf-Vogelsang (DE); Sven Klaua, Augsburg (DE)

(73) Assignee: ExOne GmbH, Gersthofen (DE)

( * ) Notice: Subject to any disclaimer, the term of this patent is extended or adjusted under 35 U.S.C. 154(b) by 509 days.

(21) Appl. No.: 15/506,779

(22) PCT Filed: Aug. 25, 2015

(86) PCT No.: PCT/EP2015/069470
§ 371 (c)(1),
(2) Date: Jul. 26, 2017

(87) PCT Pub. No.: WO2016/030391
PCT Pub. Date: Mar. 3, 2016

(65) Prior Publication Data
US 2017/0341303 A1    Nov. 30, 2017

(30) Foreign Application Priority Data

Aug. 29, 2014  (DE) .................. 10 2014 112 454

(51) Int. Cl.
*B29C 64/205* (2017.01)
*B22F 12/00* (2021.01)
(Continued)

(52) U.S. Cl.
CPC ............ *B29C 64/205* (2017.08); *B22F 12/00* (2021.01); *B29C 31/02* (2013.01); *B29C 64/165* (2017.08);
(Continued)

(58) Field of Classification Search
CPC ... B29C 64/153; B29C 64/214; B29C 64/205; B65D 90/56; F16K 7/02; F16K 7/07;
(Continued)

(56) References Cited

U.S. PATENT DOCUMENTS

| 1,095,767 A | * | 5/1914 | Adams | ..................... F16K 7/10 |
| | | | | 138/45 |
| 2,598,207 A | * | 5/1952 | Bailey | ..................... F16K 7/10 |
| | | | | 137/505 |

(Continued)

FOREIGN PATENT DOCUMENTS

| CN | 202967555 U | * | 6/2013 |
| DE | 3519651 A | * | 12/1986 |

(Continued)

OTHER PUBLICATIONS

Examination Notice issued for the corresponding DE Application No. 10 2014 112 454.5, dated Jul. 1, 2015, 5 pages (for informational purposes only).

*Primary Examiner* — Benjamin A Schiffman
(74) *Attorney, Agent, or Firm* — Viering, Jentschura & Partner MBB

(57) ABSTRACT

A coating device arrangement 1 for a 3D printer is described, comprising a coating device 3 having a container 17 defining an inner cavity for receiving particulate construction material, which leads to an opening for outputting the particulate construction material onto a construction field, as well as a closing device 31 configured to selectively close the opening for outputting the particulate construction material.

10 Claims, 13 Drawing Sheets

Figure 1:
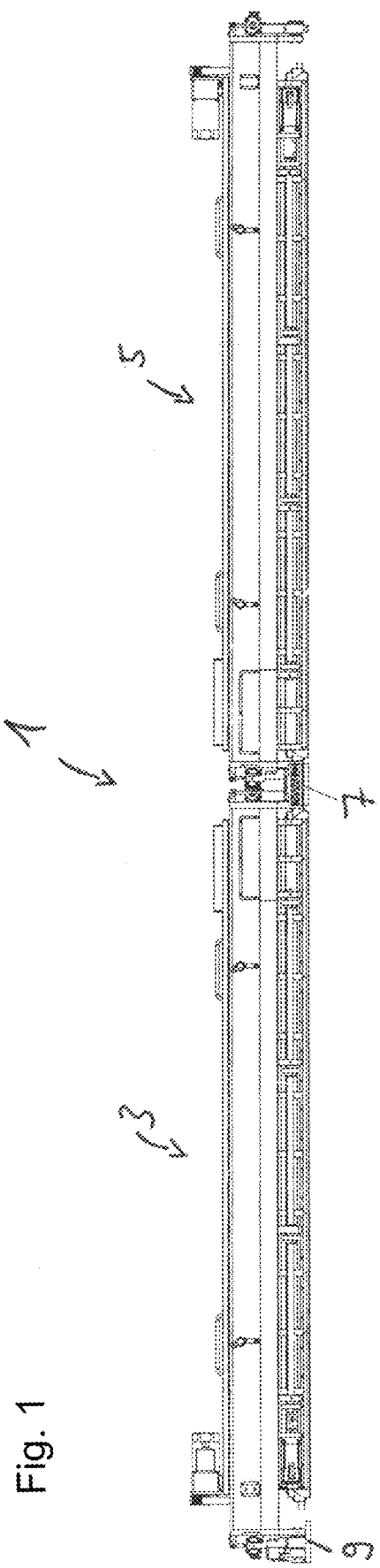

(51) Int. Cl.
  *B29C 31/02* (2006.01)
  *B29C 64/214* (2017.01)
  *B33Y 10/00* (2015.01)
  *B33Y 30/00* (2015.01)
  *B33Y 40/00* (2020.01)
  *B29C 64/165* (2017.01)
  *B22F 10/10* (2021.01)
  *B29C 64/153* (2017.01)

(52) U.S. Cl.
  CPC ............ B29C 64/214 (2017.08); B33Y 10/00 (2014.12); B33Y 30/00 (2014.12); B33Y 40/00 (2014.12); B22F 10/10 (2021.01); *B29C 64/153* (2017.08)

(58) Field of Classification Search
  CPC .. F16K 7/10; B22F 3/1055; B22F 2003/1056; B22F 2003/1057; B22F 2003/1058; B22F 2003/1059
  USPC ........................................ 251/5, 61
  See application file for complete search history.

(56) References Cited

U.S. PATENT DOCUMENTS

| | | | | |
|---|---|---|---|---|
| 2,874,925 A * | 2/1959 | Stafford | ............... | B65B 1/18 137/512 |
| 3,151,650 A * | 10/1964 | Beck | ............... | B28C 7/0076 206/568 |
| 4,496,132 A * | 1/1985 | Weingarten | ............... | F16K 7/10 251/5 |
| 5,575,453 A * | 11/1996 | Dion | ............... | B61D 27/0009 251/61.1 |
| 5,647,931 A * | 7/1997 | Retallick | ............... | B22F 3/1055 156/73.6 |
| 6,147,138 A * | 11/2000 | Hochsmann | ............ | B33Y 80/00 523/139 |
| 6,656,410 B2 * | 12/2003 | Hull | ............... | B29C 41/12 264/401 |
| 6,764,636 B1 * | 7/2004 | Allanic | ............... | B33Y 40/00 264/401 |
| 7,047,098 B2 * | 5/2006 | Lindemann | ............ | B22F 3/1055 700/119 |
| 7,748,971 B2 * | 7/2010 | Hochsmann | ............ | B29C 41/12 425/90 |
| 7,799,253 B2 * | 9/2010 | Hochsmann | ............ | B29C 64/153 264/113 |
| 7,874,445 B2 * | 1/2011 | Hochsmann | ............ | B29C 64/153 220/211 |
| 7,879,393 B2 * | 2/2011 | Ederer | ............... | B29C 41/12 427/203 |
| 7,931,462 B2 * | 4/2011 | Mattes | ............... | B33Y 40/00 425/375 |
| 10,286,571 B2 * | 5/2019 | Hochsmann | ............ | B29C 64/176 |
| 10,695,954 B2 * | 6/2020 | Hochsmann | ............ | B29C 64/214 |
| 10,695,981 B2 * | 6/2020 | Hochsmann | ............ | B33Y 30/00 |
| 2005/0263932 A1 | 12/2005 | Heugel | | |
| 2007/0095945 A1 * | 5/2007 | Keudell | ............... | B05B 7/1459 239/398 |
| 2009/0045553 A1 * | 2/2009 | Weidinger | ............ | B33Y 40/00 264/497 |
| 2013/0216703 A1 | 8/2013 | Stillwell et al. | | |

FOREIGN PATENT DOCUMENTS

| | | | | |
|---|---|---|---|---|
| DE | 19649865 C1 * | 2/1998 | ............ | B22F 3/1055 |
| DE | 10235427 A1 | 2/2004 | | |
| FR | 2285558 A * | 5/1976 | | |

* cited by examiner closing device open closing device closed

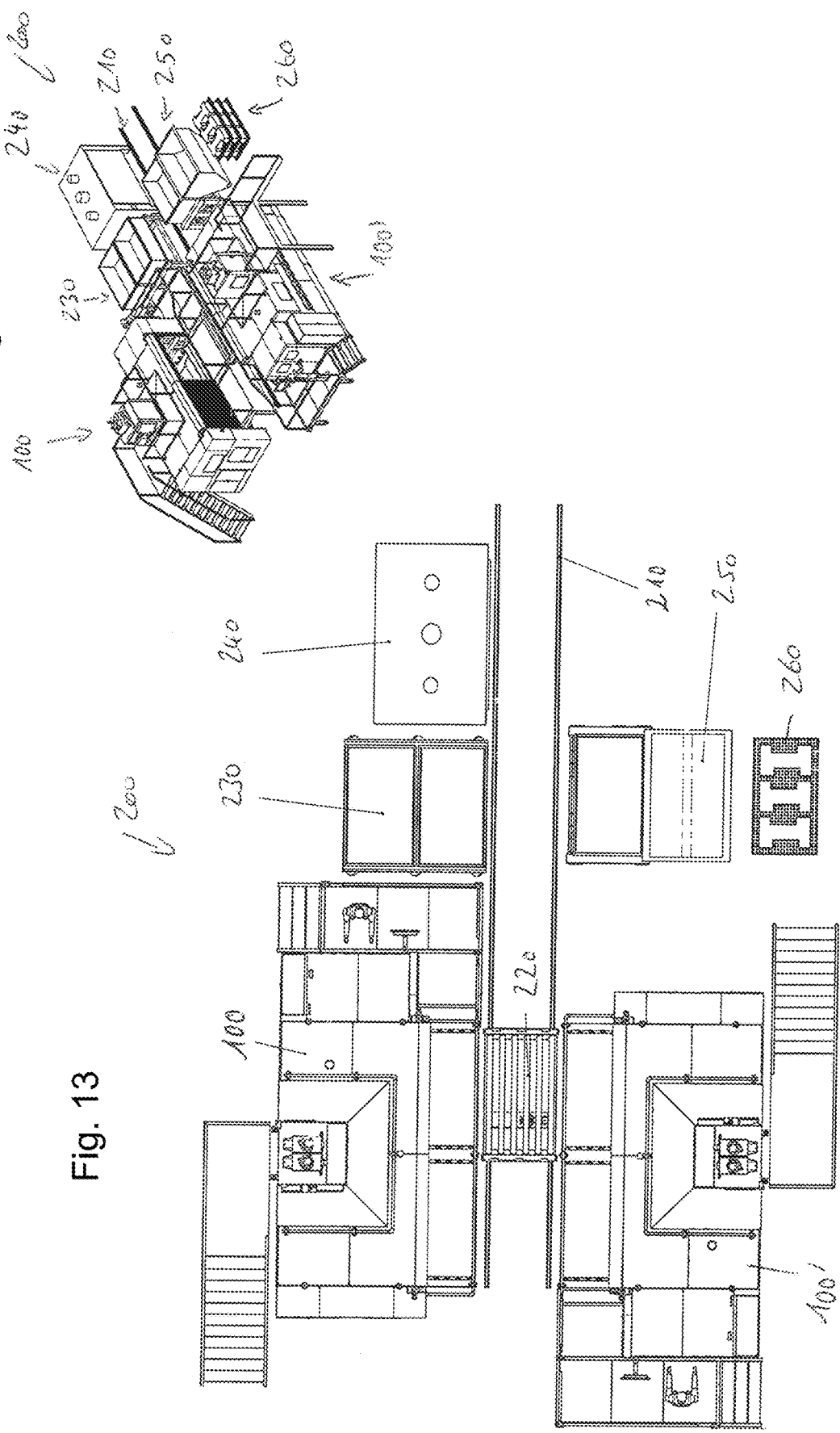

COATER ARRANGEMENT FOR A 3D PRINTER

The present invention relates to a coating device arrangement for a 3D printer, a 3D printer having such a coating device arrangement, different generative manufacturing processes, and a coating device cleaning method.

Various generative manufacturing processes (and consequently various types of 3D printers) are known.

Some generative manufacturing processes have the following steps in common:

(1) First, particulate material is applied over the entire surface of a construction field, so as to form a layer of unsolidified particulate material.

(2) The applied layer of unsolidified particulate material is selectively solidified in a predetermined partial area, for example by selectively printing a treatment agent, for example a binder (alternatively, for example, by laser sintering).

(3) Steps (1) and (2) are repeated to manufacture a desired component. For this purpose, a construction platform on which the component is built up in layers may, for example, be lowered by respectively one layer thickness before a new layer is applied over the entire surface (alternatively, the coating device and the printing device may, for example, be raised by respectively one layer thickness).

(4) Finally, the manufactured component which is supported and surrounded by loose, unsolidified particulate material may be unpacked.

The construction space in which the component or the components is/are manufactured may, for example, be defined by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as construction field. An example of such a construction box is, for example, described in DE 10 2009 056 696 A1.

A coating device arrangement having a coating device (also referred to as a "recoater") is normally used in the above step (1). Various coating device arrangements are known for use in 3D printers, by means of which a particulate construction material may be applied to the construction field (also referred to as construction surface or construction area) in the form of an even layer over the entire surface.

One type of coating device arrangement uses a roller (short: "roller coating device") in front of which first an amount of particulate construction material is put down and which is then horizontally moved across the construction field to apply the particulate construction material in the form of an even layer onto the construction field. In this respect, the roller may be rotated opposite to the running direction. Coating device arrangements with great lengths are difficult to realize using a roller coating device.

Another kind of coating device arrangement (a so-called coating device arrangement having a "container coating device", for example a "slot coating device") uses a coating device with a container which is displaceable across a construction field and defines an inner cavity for receiving particulate construction material which leads to an opening for outputting the particulate construction material onto the construction field. The coating device may be elongate, for example to span or to cover the length or width of a rectangular construction field. The opening may then be provided as a longitudinal slot. The coating device can thus be moved horizontally across the construction field and at the same time output particulate construction material from the opening onto the construction field to thereby apply an even layer over the entire surface of the construction field.

In the above step (2), a printing device having a print head may for example be used, which applies a treatment agent in a controlled way onto a subarea of the construction material layer applied before. The treatment agent contributes to an (immediate and/or subsequent) solidification of the construction material layer in the subarea. For example, the treatment agent may be a binder, for example a binder component of a multicomponent binder.

Alternatively, a laser may, for example, be used in the above step (2) to solidify a subarea of the construction material layer applied previously, for example by sintering or melting the construction material in the subarea.

The present invention relates to a coating device arrangement of the second type, briefly a coating device arrangement having a "container coating device", for example a "slot coating device".

Coating devices of this type may, for example, be provided with a vibration device by means of which the particulate material may be vibrated to influence, for example to support, the flow or trickle behavior of the particulate construction material or the discharge of the particulate construction material from the opening. A vibration device of this type may, for example, be formed by a shaking device by means of which at least a wall portion of the container is vibrated or exposed to a shaking motion to influence the discharge of the particulate construction material.

In addition, coating device arrangements of this type may, for example, be provided with a labyrinth structure inside the container, which may prevent the construction material from flowing out/escaping when the coating device stands still.

Moreover, coating device arrangements of this type may, for example, be provided with a stroking/sweeping member, by means of which construction material applied to the construction field may be stroked to compress and/or level the construction material.

An example of a coating device arrangement having a "slot coating device" is known from DE 10 2009 056 689 A1. See therein, for example, FIGS. 17 to 20.

It is, in addition, known to clean the container lower side using a coating device cleaning device. An appropriate coating device cleaning device is, for example, known from DE 10 2009 056 687 A1. See therein, for example, FIG. 21.

EP 1234625 A1 discloses a device for selectively applying material powder, in which an application unit comprises a slot-shaped opening in which several scanning members are arranged next to each other, wherein the scanning member captures superelevations of a shaped body and a closing portion of the scanning member closes the opening at a particular level.

It may be considered as a problem underlying the invention to provide a coating device arrangement for a 3D printer of the "container coating device" type, which allows for an efficient application of particulate material and/or an increased installation throughput and/or has an improved manageability/operability. Moreover, corresponding methods are to be provided.

The present invention provides a coating device arrangement for a 3D printer, a 3D printer having such a coating device arrangement, various generative manufacturing processes, as well as a coating device cleaning method. Further embodiments of the coating device arrangement are described in dependent claims.

According to various embodiments of the invention, a coating device arrangement may be provided by way of illustration, by means of which particulate construction material can be applied efficiently. For example, by way of illustration, the loss of construction material may be kept at a low level according to various embodiments of the invention. For example, a possible loss may be avoided or reduced during a coating-free journey or during a coating-free travel phase (=journey or travel phase during which no layer of particulate material is to be formed (for example not yet or no longer), for example a return journey of a unidirectional coating device or an advance and/or follow-up travel phase of a coating device in front of or behind the construction field). For example, a degradation of the construction material present in the container may be avoided or reduced, for example upon/after termination or in case of an interruption of a construction job. In this respect, for example a binder component contained in the construction material and/or an additive contained in the construction material may be protected from an atmosphere present in the installation process space by closing the coating device opening, which atmosphere may for example contain another binder component (in vapor form or in gas form). Liquid components of the construction material mixture may, in addition, be protected from drying out. For example, a loss of construction material present in the container during a cleaning process of the container may be avoided or reduced.

According to different embodiments of the invention, a coating device arrangement for particulate construction material may be provided by way of illustration, by means of which the throughput can be increased. According to various embodiments of the invention, it is for example possible to increase the size of the output opening and thus eventually also the speed of the coating device at which the coating device may be moved across the construction field. In contrast, the output opening according to the state of the art (and thus eventually also the coating device speed) is limited to a size which suppresses/does not allow a discharge/trickling-out in a standstill mode of the coating device. Although the size of the output opening may be increased to a certain degree by using a labyrinth structure within the container, even in this case the coating device speed is determined and limited by the size of the output opening. In addition, it is for example possible according to various embodiments of the invention to interconnect two coating devices serving a respectively associated construction field in a simple and compact way in terms of construction, in order to increase the throughput.

According to various embodiments of the invention, the handling of a coating device arrangement can be improved by way of illustration. For example, a cleaning of the coating device in a coating device cleaning station can be made easier according to various embodiments of the invention. By closing the opening of the coating device at least temporarily during its cleaning, thereby reliably avoiding an undesired discharge of particulate material, the coating device arrangement, for example one or more stroking members thereof, may be cleaned in a simple and reliable way, for example by wiping (for example brushing) the stroking member or stroking members, for example using the coating device cleaning device described in DE 10 2009 056 687 A1.

In this respect, particulate construction material within the meaning of this application may be understood as a construction material comprising at least one kind of particulate material (for example (grains of) sand, for example foundry sand, and/or metal particles and/or particles of synthetic material). Also, various types of particulate material may be included in the construction material, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. If the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core, a construction material composition specifically prepared for this purpose may be used. In this respect, the construction material composition may be defined by the number of components used as well as by the respective type and the respective share of components contained in the construction material (mixture). In this respect, the trickle or flow behavior of the construction material may vary considerably depending on the construction material composition.

According to different embodiments, a coating device arrangement for a 3D printer may comprise:

a coating device having a container defining an inner cavity for receiving particulate construction material, which leads into an opening for outputting the particulate construction material (for example onto a construction field of a 3D printer), and a closing device configured to selectively close the opening for outputting the particulate construction material.

The coating device may, for example, be movable across a construction field of a 3D printer, for example in a horizontal direction. For example, the coating device may be movable along a linear guiding structure for this purpose, for example by means of a slide to which the coating device is fixed.

For example, the coating device may further comprise a vibration device, by means of which the particulate material in the container can be vibrated, to thereby influence the flow or trickle behavior of the particulate construction material, to ensure an appropriate output of particulate material from the opening during a coating journey. A vibration device of this type may, for example, be provided by a shaking device, by means of which at least a wall portion of the container can be exposed to vibration or to a shaking motion, to thereby influence the flow behavior of the particulate construction material.

In this respect, the container may, for example, be configured as a so-called shaking container, at least one side wall of which can be exposed to a shaking motion, to thereby fluidize construction material received in the container (i.e., to influence its flow behavior or its discharge).

For example, another container (a so-called "charging container") may be arranged above the container. A distributing device, for example in the form of a distributing worm may be received in said other container.

The container (for example also the other container) may, for example, be fixed to a carrier structure of the coating device. The carrier structure may, for example, extend in a horizontal direction which is perpendicular to the direction in which the coating device is displaceable. The carrier structure may, for example, comprise one or more carriers which with their longitudinal axis extend in the horizontal direction which is perpendicular to the direction in which the coating device is displaceable. For example, the container may be connected to the carrier structure by means of a damping device on a first side and by means of a shaking device on a second side.

The container is formed to be elongate. The longitudinal axis of the container may, for example, extend in the horizontal direction which is perpendicular to the direction in which the coating device is displaceable. The opening is formed as a longitudinal slot. The longitudinal axis of the longitudinal slot may extend in the horizontal direction which is perpendicular to the direction in which the coating device is displaceable.

The container may, for example, taper downward in cross section, and may, for example, be funnel-shaped in cross section.

The container may, for example, be open in an upward direction.

The opening and the longitudinal slot, respectively, may for example be located at a lower end portion of the container, i.e. at the end portion of the container facing the construction field, and may, for example, be directed downward and toward the construction field.

The construction field may, for example, be defined by a construction platform and/or construction box (also referred to as "job box"), above or in which a component is/can be constructed by means of a 3D printer in a generative manufacturing process. The construction box may, for example, receive a height-adjustable construction platform which is gradually lowered during the generative manufacturing process (or during a so-called "construction job"). The drive for the height adjustment may, for example, be provided either directly in the construction box ("travelling along") or, for example, in a stationary way ("installation-fixed") in the 3D printer. The construction box may, for example, be displaceable out of or into the 3D printer, for example through a roller conveyor and/or through its own travel drive integrated in the construction box. The construction box may, for example, be provided as described initially, for example as described in DE 10 2009 056 696 A1.

The closing device may, for example, be configured to selectively close the opening for outputting the particulate construction material in a controlled way (for example by means of a "controller" or an electronic control unit), for example (at least temporarily) during a construction job (i.e., during the manufacturing process of a component) and/or at the end of a construction job.

The closing device comprises at least one closing member (for example one or two closing members) which is attached to the coating device and which is configured to selectively cover the opening at least in part (for example to "underlap" the same), in particular to thereby close the opening selectively (for example alone or together with another closing member).

I.e., the opening is first open/uncovered by the closing device in the plan view, and is covered by a respective closing member at least in part in the closing position of the closing device. One single closing member may, for example, cover the opening entirely in the closing position, and several closing members may, for example, respectively cover the opening in part in the closing position, to thereby close the opening together. Several (for example two) closing members may, for example, be arranged on sides of the opening opposed in a coating device cross-direction, i.e. in cross section to the right and to the left of the opening.

To simplify matters, reference is hereinafter in part made to "the closing member"; it should, however, be understood that more closing members may be provided as well and that the described features may then apply to a respective closing member. Hence, the features can be applied to a respective closing member, even if this is not always mentioned explicitly.

The closing member may, for example, be attached to the/a carrier structure of the coating device, for example separately with respect to the container and/or in a way to be shaking motion-decoupled from the container and/or in a substantially rigid manner.

The closing member attached to the coating device may therefore be fixed to the coating device so as to be displaceable together with the same.

The closing member has an elongate shape. The longitudinal axis of the closing member may, for example, extend substantially parallel to the longitudinal extension of the slot. The length of the closing member may, for example, be equal to or greater than the length of the opening and the slot, respectively.

The closing member covers the opening selectively at least in part as a result of a lateral movement and/or displacement (for example lateral expansion). The lateral movement and/or displacement may, for example, take place toward the opening.

The closing member may, for example, be movable and/or deformable and/or expandable substantially in a horizontal direction, for example perpendicularly to its longitudinal axis and/or perpendicularly to an imaginary vertical line/plane which extends through the opening and the slot, respectively, for example toward the vertical line/plane.

According to various embodiments, the closing member may, for example, be arranged underneath the opening, for example in a vertical direction underneath the opening, for example at a (little) vertical distance to the opening. In other words, the closing member may be arranged outside or underneath the container. Thereby, it is possible to uncouple the closing member or the closing device and the container from each other to a certain degree, for example with respect to a possible vibration generated by the vibration device and taking place in the container for fluidizing the particulate material.

The closing member may, for example, be arranged laterally next to the opening in a horizontal direction.

According to various embodiments, the coating device may, for example, further comprise at least one stroking/sweeping member (the stroking/sweeping member may, for example, be (co-)formed by the coating device, for example by a portion projecting downward and/or a lower end portion thereof, or may, for example, be attached to the coating device as a separate component), which is configured to stroke construction material output from the opening (for example onto the/a construction field), in order to level and/or compress the output particulate material, the at least one closing member being arranged above the at least one stroking member. The closing member may thus, for example, be arranged between the opening and the stroking member. By arranging the closing member above the stroking member and in particular between the opening and the stroking member, the closing member can be easily and reliably integrated in the coating device arrangement; at the same time, an appropriate output (including an optional fluidization/vibration/shaking) and an appropriate levelling and/or compression can be allowed.

For example, the coating device arrangement may comprise two stroking members, one on each side of the opening (in a coating device cross direction). In this case, for example a first closing member may be arranged above the first stroking member and a second closing member may be arranged above the second stroking.

For example, the (respective) stroking member may form a stroking surface facing the construction field (for example a substantially planar stroking surface) which strokes the construction material output onto the construction field, to level and/or compress the dispensed particulate material. The (respective) stroking member may, for example, be provided in the form of a so-called stroking bar/strip and/or stroking blade, which may, for example, be made of metal, for example steel.

The at least one stroking member may, for example, be attached to the coating device, for example to the carrier structure of the coating device, for example separately from the container and/or shaking movement-decoupled from the container and/or in a substantially rigid way. The stroking member attached to the coating device may thus, just like the closing member, be fixed to the coating device to be displaceable together with the same.

The at least one stroking member and the at least one closing member may, for example, be connected in a fixed way and/or may be fixed to the carrier structure together, for example may be suspended therefrom together. For example, the closing member may be attached to an upper side (a side facing away from the construction field) of the stroking member, for example be supported thereby.

According to various embodiments, the (at least one) closing member may, for example, comprise a sealing surface configured to seal on a counter surface in a closing state of the closing device, the sealing surface being made of a flexible material. Hereby, the opening or slot can be closed reliably, for example also when/because the flexible material can adapt to the contour of the counter surface (including construction material particles locked therebetween). The flexible material may, for example, be an elastomer and/or silicone. The counter surface may, for example, be formed by a stationary counter surface or another closing member which is arranged on the other side of the opening.

The at least one closing member is formed by a hollow body (for example an elongate hollow body), the inner cavity of which is delimited by a deformable portion which is deformable outwards (starting from the inner cavity) by a pressure fluid introduced in the hollow body, thereby expanding the inner cavity (for example substantially perpendicular to the longitudinal axis of the hollow body and/or to the above-described imaginary vertical line/plane through the opening or slot), to thereby cover the opening at least in part. The hollow body may, for example, comprise an expansion portion formed by the deformable portion, where the hollow body can be deformed specifically/deliberately. The deformable portion or expansion portion may, for example, extend along the entire longitudinal extension of the slot and/or the elongate hollow body. The elongate hollow body or at least the deformable portion thereof may, for example, be made of an elastomer and/or silicone.

The closing member in the form of a (for example elongate) hollow body has proven its worth in practice (including the subsequently described embodiment with two hollow bodies), can easily be integrated in the coating device and can, in addition, allow for a reliable closing of the slot.

According to various embodiments, the closing device may, for example, comprise a first and a second (for example elongate) hollow body (forming a first and a second closing member), each of the two hollow bodies having an inner cavity limited by a deformable portion, both hollow bodies being arranged on opposite sides of the opening (in a coating device cross direction) in such a way that the deformable portions face each other, the deformable portions being configured to be deformed outward by a pressure fluid supplied to the associated hollow body, thereby expanding the inner cavity, so that both deformable portions may be moved toward each other and may be contacted to thereby close the opening.

According to various embodiments, the (respective) deformable portion may be concavely/inwardly curved (thereby, for example, forming a portion projecting into the cavity) with the coating device opening being uncovered (for example in an unloaded state or in a state in which there is no charge/supply with pressure fluid), and is able to curve outwardly by a pressure fluid supplied to the (respective) hollow body to close the opening.

According to various embodiments, the closing device may, for example, further comprise a fluid line structure through which the (respective) hollow body can be brought into or is in fluid connection with a pressure fluid source.

The pressure fluid source may, for example, be configured to selectively supply the hollow body with pressure fluid through the fluid line structure.

The fluid line structure may, for example, comprise a hose line structure (for example comprising one or more hoses) which is connected to the (respective) hollow body to supply the hollow body with pressure fluid. The hose line structure may, for example, be configured as a drag hose line structure and may, for example, be integrated in a drag chain which, for example, additionally supplies the coating device (for example one or more drives of the coating device) with electric current by means of one or more trailing cables.

The pressure fluid source may, for example, be a compressed air source. For example, the pressure fluid source may comprise a pressure vessel, an optional pressure reducer and an armature (for example a valve). The pressure vessel may, for example, be a stationary pressure vessel, i.e. a pressure vessel which does not travel along with the coating device. The armature provided for example on the pressure vessel or between the pressure vessel and the coating device on the fluid line structure may, for example, be closed or opened by a control unit (for example by the control unit as described later) through a drive connected to the armature, to thereby selectively provide the hollow body with pressure fluid to thereby close the opening.

According to various embodiments, the closing device may further comprise a control unit (for example a "controller" or an electronic control unit) configured to selectively close the opening in a controlled way by means of the at least one closing member (for example by means of a controlled deformation and/or movement of the closing member). For example, the control unit may be configured (for example programmed) to carry out one or more of the later described methods.

For example, the control unit may be connected to the above-mentioned pressure fluid source (for example to the armature thereof) and may be configured to control the pressure fluid source to close the opening in such a way that the pressure fluid source supplies the hollow body with pressure fluid to deform it on its deformable portion.

According to various embodiments, the coating device arrangement may comprise a plurality of coating devices (for example two or more coating devices) which are equipped with a respective, separate closing device, so that the opening of a respective coating device can be closed independently and selectively. The opening of a respective coating device may therefore be opened and closed independent of the opening of the other coating device.

In this respect, the respective closing device may, for example, be configured as described above.

I.e., a first coating device may, for example, serve a first construction field, whereas a second coating device serves a second construction field.

The first and second construction field may, for example, be arranged adjacent to each other. The first and second construction field may, for example, be arranged in a common 3D printer, for example within a shared installation housing thereof and/or in a shared installation process space thereof, and/or may be served by a shared printing device. For example, the first and second coating device can be supplied with construction material by a shared feeding unit integrated in the 3D printer.

The first and second coating device may, for example, be arranged one after the other in a longitudinal direction, i.e. the longitudinal axes/longitudinal extensions of the two coating devices may be in extension to each other or parallel to each other.

For example, the coating devices may be displaceable together across a respectively associated construction field. I.e., the first and second coating device may be firmly connected to each other, for example by means of a shared base plate and/or a shared slide.

According to various embodiments, the coating device arrangement may further comprise a control unit (for example the above-described control unit) which is configured (for example programmed) to close the closing device if the construction job allocated to the coating device (or the construction field which the coating device serves) is finished and/or interrupted, and/or to close the associated coating device by means of its closing device upon/after termination of a construction job allocated to one of the several coating devices.

I.e., for example in the case of two interconnected coating devices, the coating device closed by means of the associated closing device may travel along with the still active coating device or may be displaced across its associated construction field together with the same (until the construction job of the other coating device is finished as well), without construction material remaining in the coating device being dispensed from the coating device and/or degraded, whereby construction material may be prevented from being lost and/or degraded.

Generally, in case of one or more coating devices, the construction material remaining in the respective coating device may be protected from the atmosphere in the construction space of the installation, to avoid or reduce, for example, a deterioration or reaction of the construction material.

Alternatively or in addition, the control unit may be configured to close the closing device of the coating device during a coating-free journey, for example a coating-free return journey of a unidirectional coating device, and/or to close the closing device of the coating device (for example at least temporarily) during a coating-free travel phase, for example during an advance and/or follow-up travel phase, (for example an acceleration and/or deceleration section in front of or behind the construction field), and/or to close the closing device of the coating device (for example at least temporarily) in a standstill position of the coating device (for example during a selective solidification of the last applied layer), and/or to close the closing device of the coating device (for example at least temporarily) for cleaning the coating device (for example the stroking member thereof).

According to various embodiments, a 3D printer (or a "3D printing installation") may comprise a coating device arrangement which is configured as described above.

For example, several 3D printers may form a 3D printer arrangement.

For example, the (respective) 3D printer may further comprise:

a printing device for the selective and controlled output of a treatment agent, which is configured to print the treatment agent on a predetermined subarea of a previously applied construction material layer (the treatment agent dispensed by means of the printing device contributes to a selective solidification and may, for example, be a binder component of a multicomponent binder, another binder component being included in or added to the construction material); and/or a feeding unit integrated in the 3D printer, by means of which construction material can be freshly prepared and fed to the coating device, and/or one or more construction platforms and/or construction boxes which define a respective construction field.

The printing device may, for example, be displaceable horizontally, for example in a direction perpendicular to the direction in which the at least one coating device is displaceable. The printing device may, for example, be configured to serve several construction fields. The printing device may, for example, be additionally displaceable in the direction in which the at least one coating device is displaceable as well, so that it can travel across the construction field or the construction fields in a meandering course, for example in the shape of a U.

Alternatively, a respective construction material layer may, for example, be selectively solidified, for example sintered, by means of a laser (so-called "selective laser sintering").

According to various embodiments, a generative manufacturing process may be provided, in which a first construction job is carried out in a first construction area and, at the same time, a second construction job is carried out in a second construction area, wherein the first construction area is served by a first coating device and the second construction area is served by a second coating device, wherein the first and the second coating device are moved for example together across the first and second construction area, respectively, and wherein, if the first construction job is finished, an output opening for outputting construction material of the first coating device is closed by means of a closing device.

For example, the first construction area and the second construction area may be arranged to be horizontally adjacent to each other.

The first and second coating devices may, for example, be configured as described above. The same applies to the closing device.

The first construction job is less time-consuming than the second construction job, wherein the second construction job is completed on completion of the first construction job; during this time, the first coating device is further moved across its associated construction area together with the second coating device, without, however, outputting construction material.

According to various embodiments, a generative manufacturing process may be provided, in which a coating device is moved (repeatedly) across an associated construction area, to output particulate construction material in the form of a (respective) uniform layer onto the construction area, wherein an output opening of the coating device is closed at least temporarily by means of a closing device attached to the coating device, during a coating-free journey, for example during a coating-free return journey of a unidirectional coating device, and/or during a coating-free travel phase, for example an advance and/or follow-up travel phase, and/or in a standstill position of the coating device, and/or upon/after termination and/or interruption of a construction job, and/or for cleaning the coating device (for example pre-cleaning, post-cleaning and/or intermediate cleaning with respect to a construction job).

According to various embodiments, a coating device cleaning method may be provided, wherein a coating device of a 3D printer is moved to a cleaning station to clean the coating device (for example to brush the lower side thereof), wherein an output opening of the coating device is closed during a cleaning process of the coating device, for example during a cleaning of a stroking member thereof, at least temporarily by means of a closing device attached to the coating device.

Hereby, for example an undesired discharge of particulate material during the cleaning process can be avoided.

In the above-mentioned generative manufacturing processes/production processes and/or the above-described coating device cleaning method, a coating device arrangement configured as described above and/or a 3D printer configured as described above may be used. In addition, the above generative manufacturing processes/production processes may, for example, comprise the initially mentioned steps/features (1) to (4).

Exemplary, but non-limiting embodiments of the invention are shown in the Figures and are hereinafter described in detail.

FIG. 1 shows a lateral view of a coating device arrangement according to a first embodiment of the invention.

Figure 2:
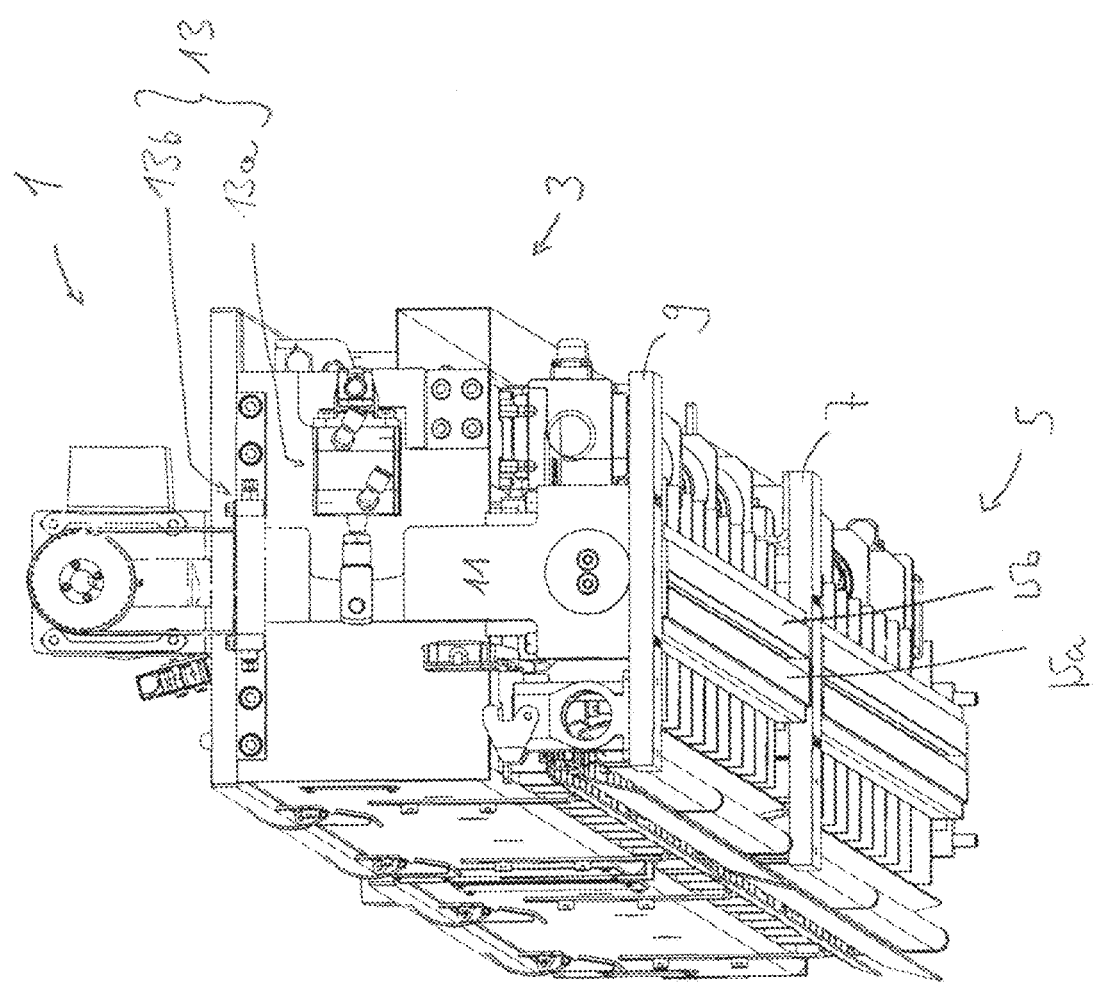
Figure 3:
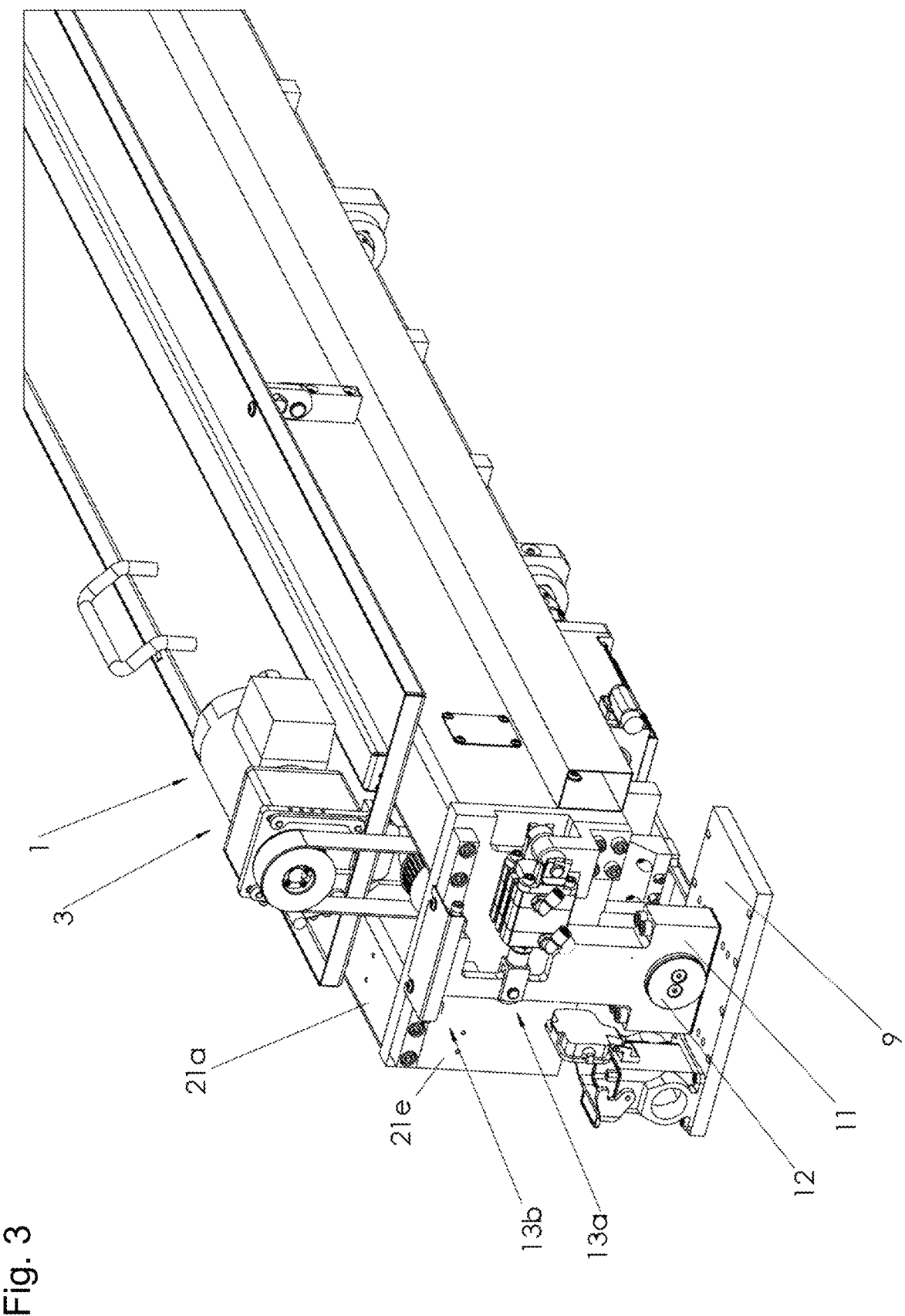
Figure 4:
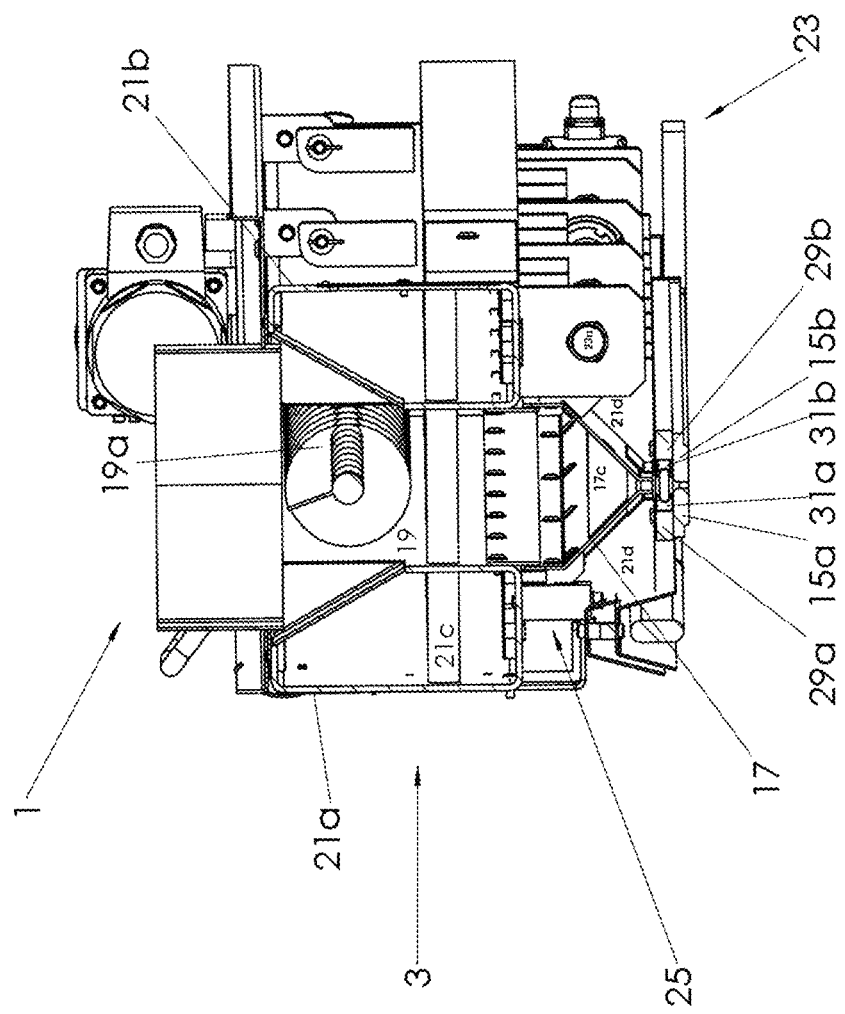
Figure 5:
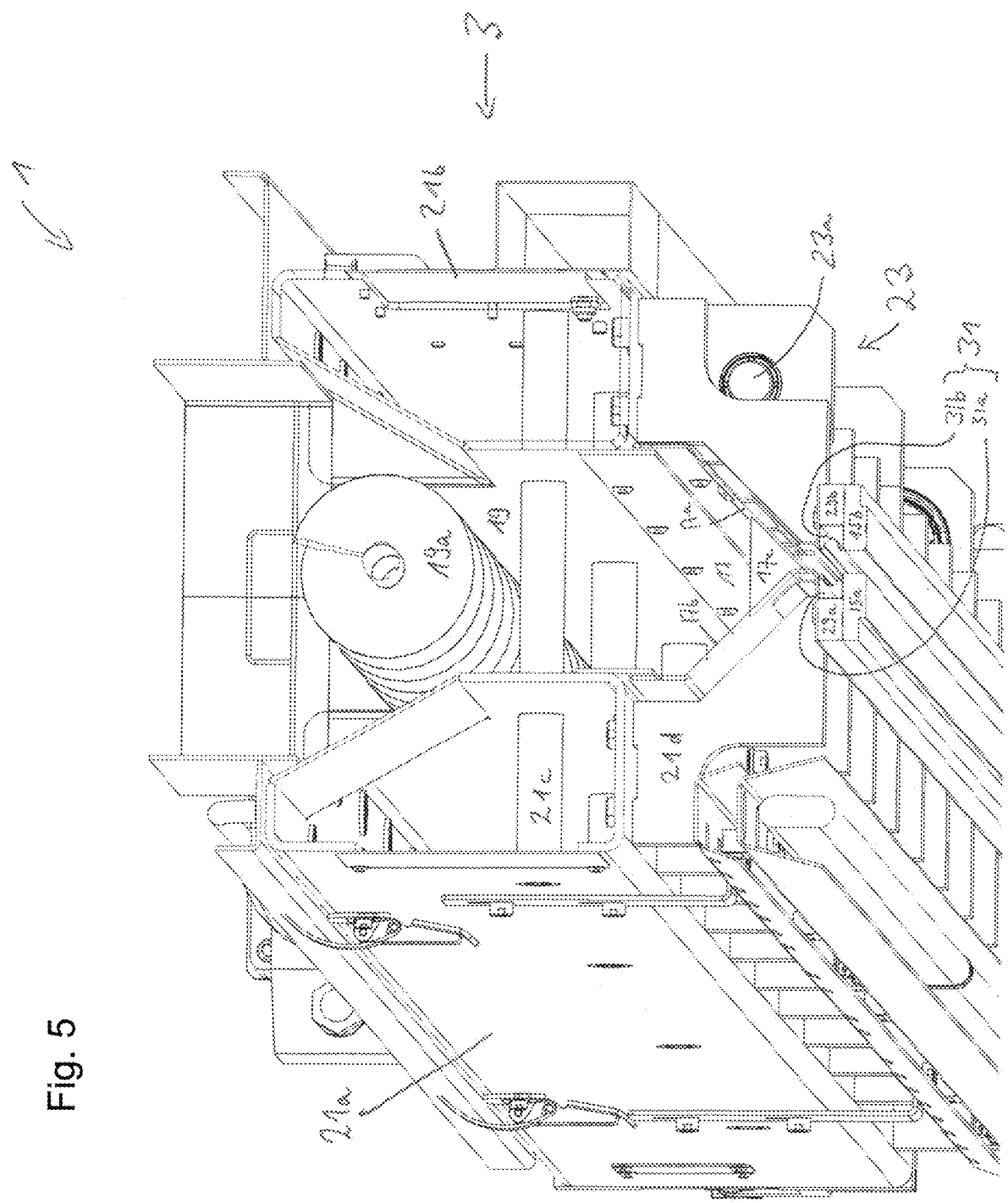
Figure 6:
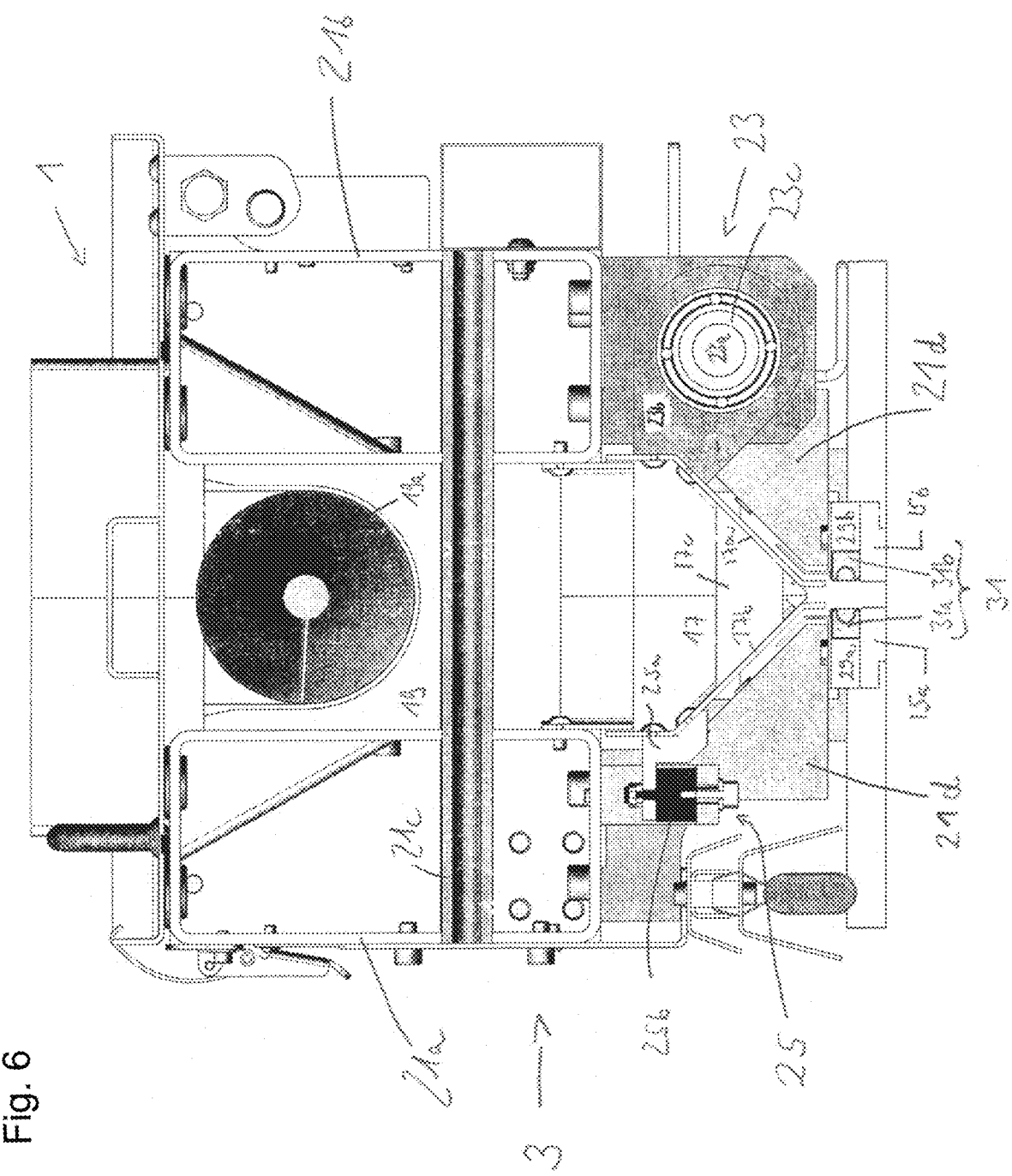
Figure 7:
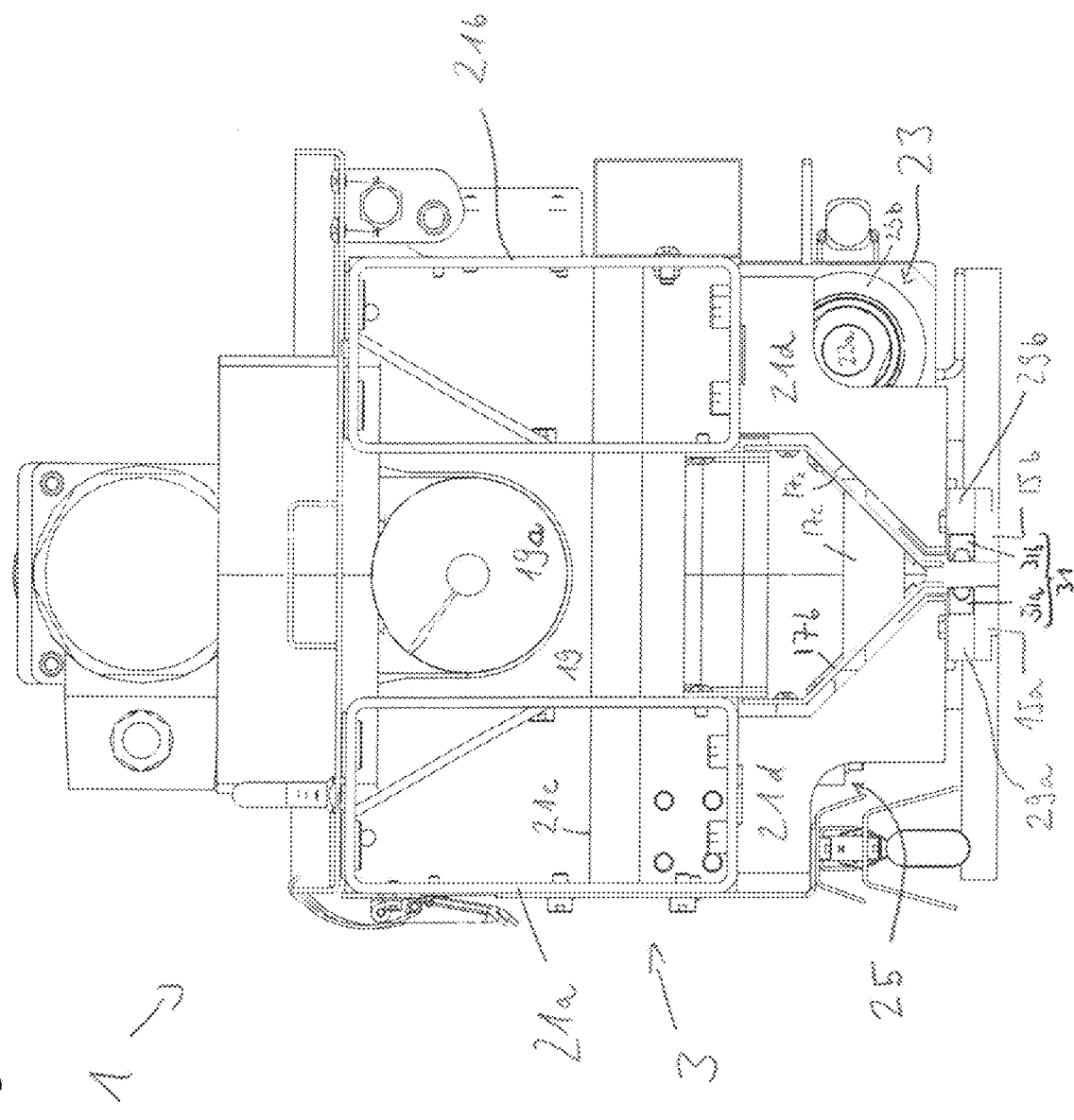
Figure 8A:
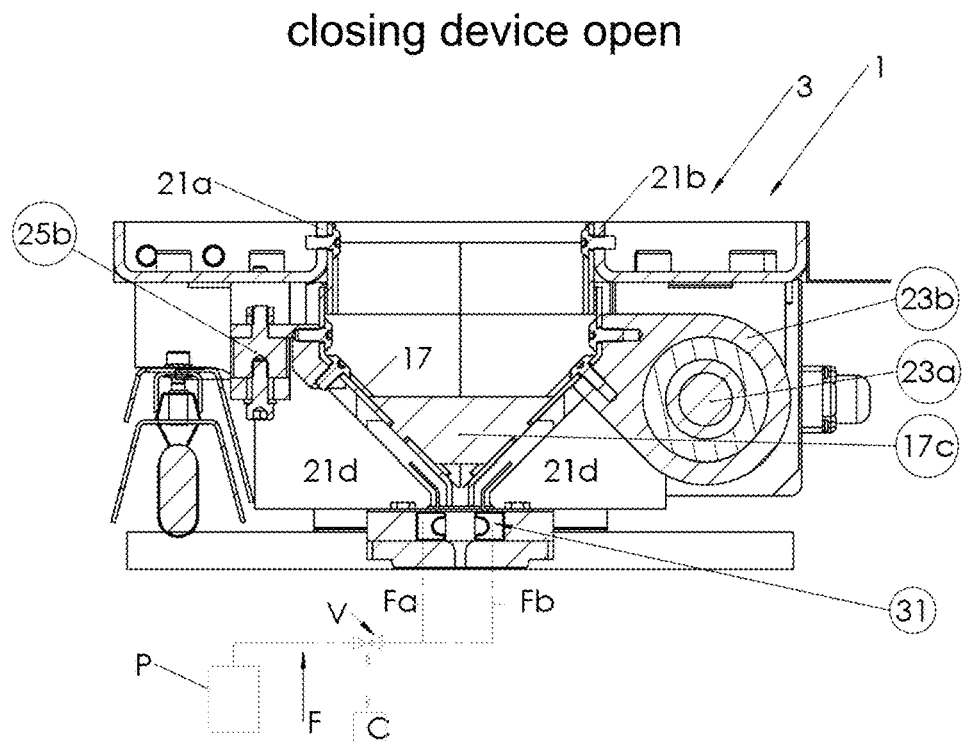
Figure 8B:
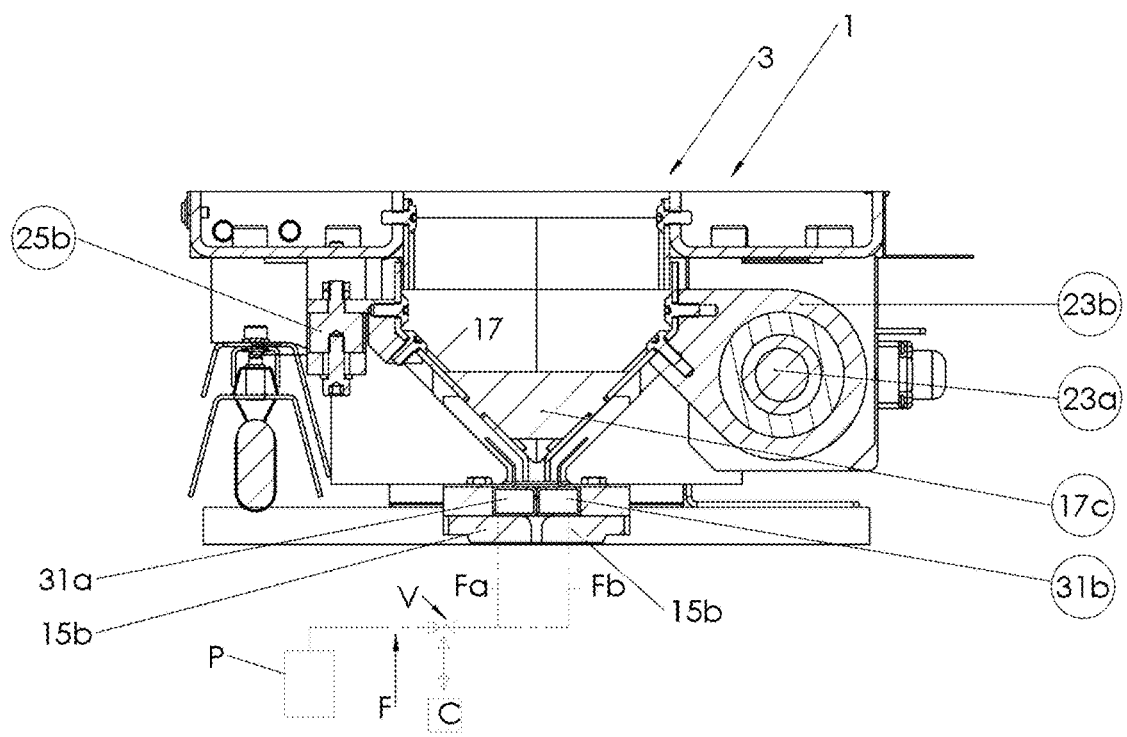
Figure 9:
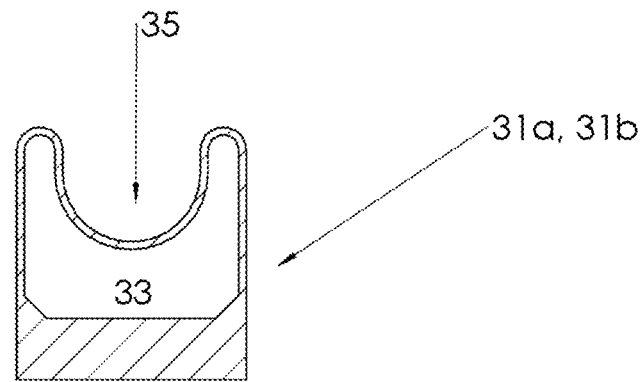
Figure 10:
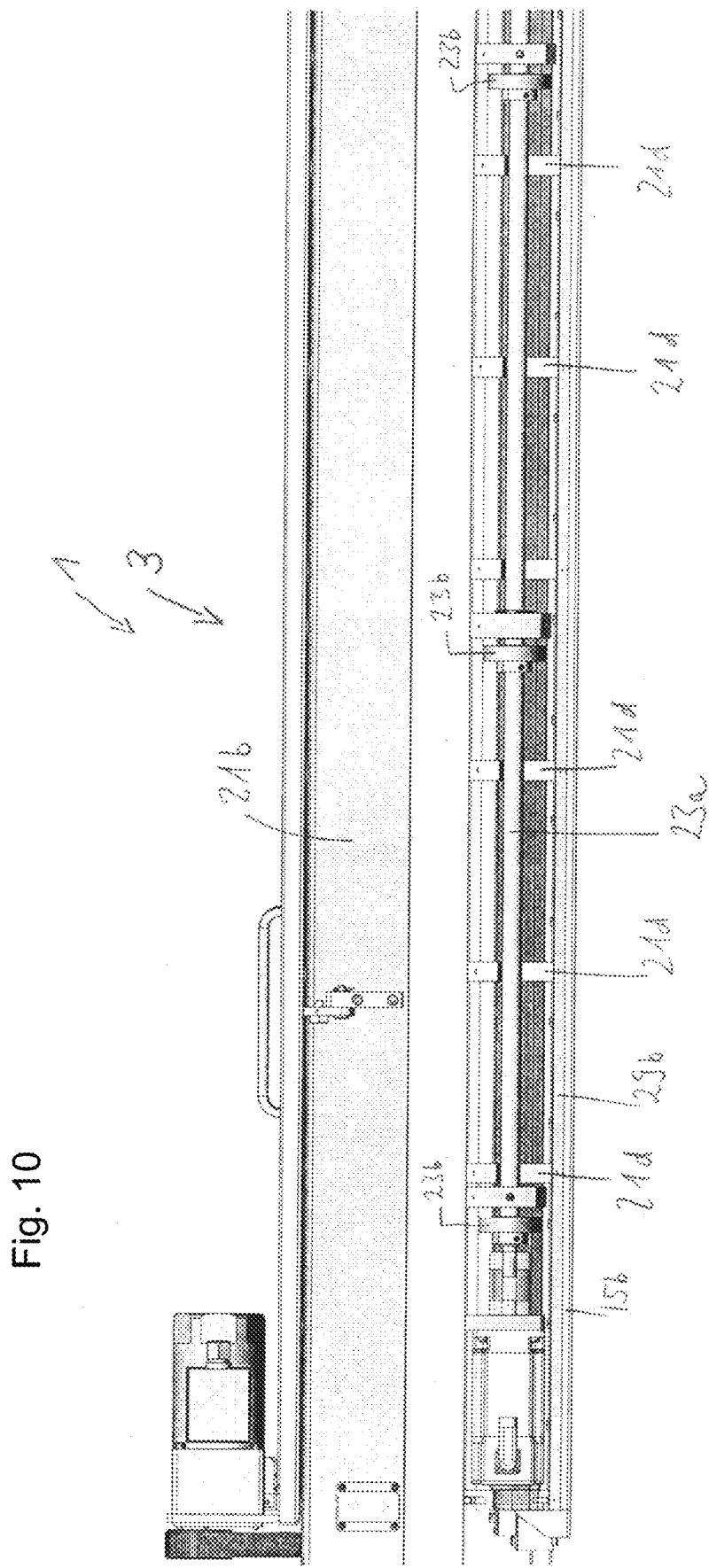
Figure 11:
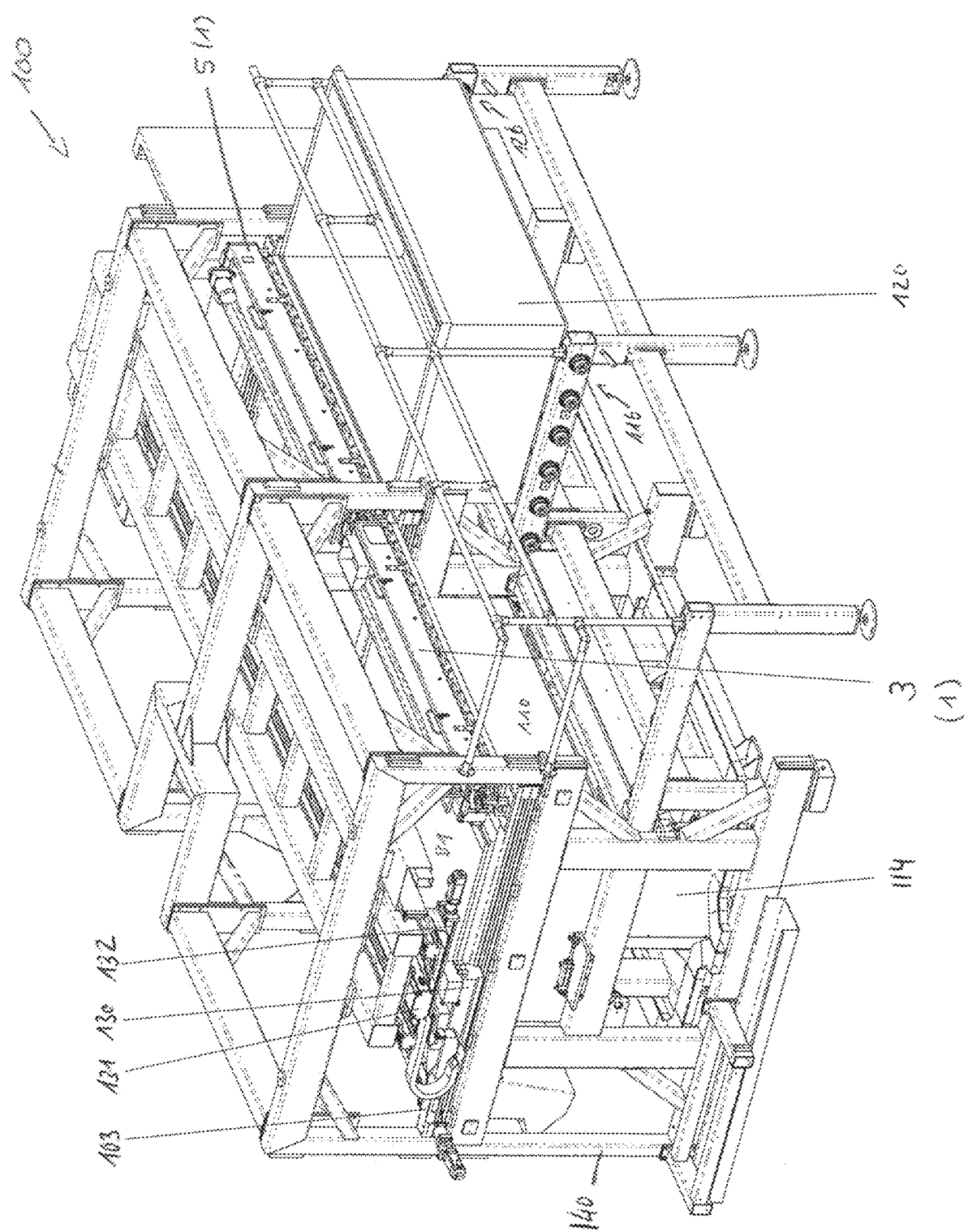
Figure 12:
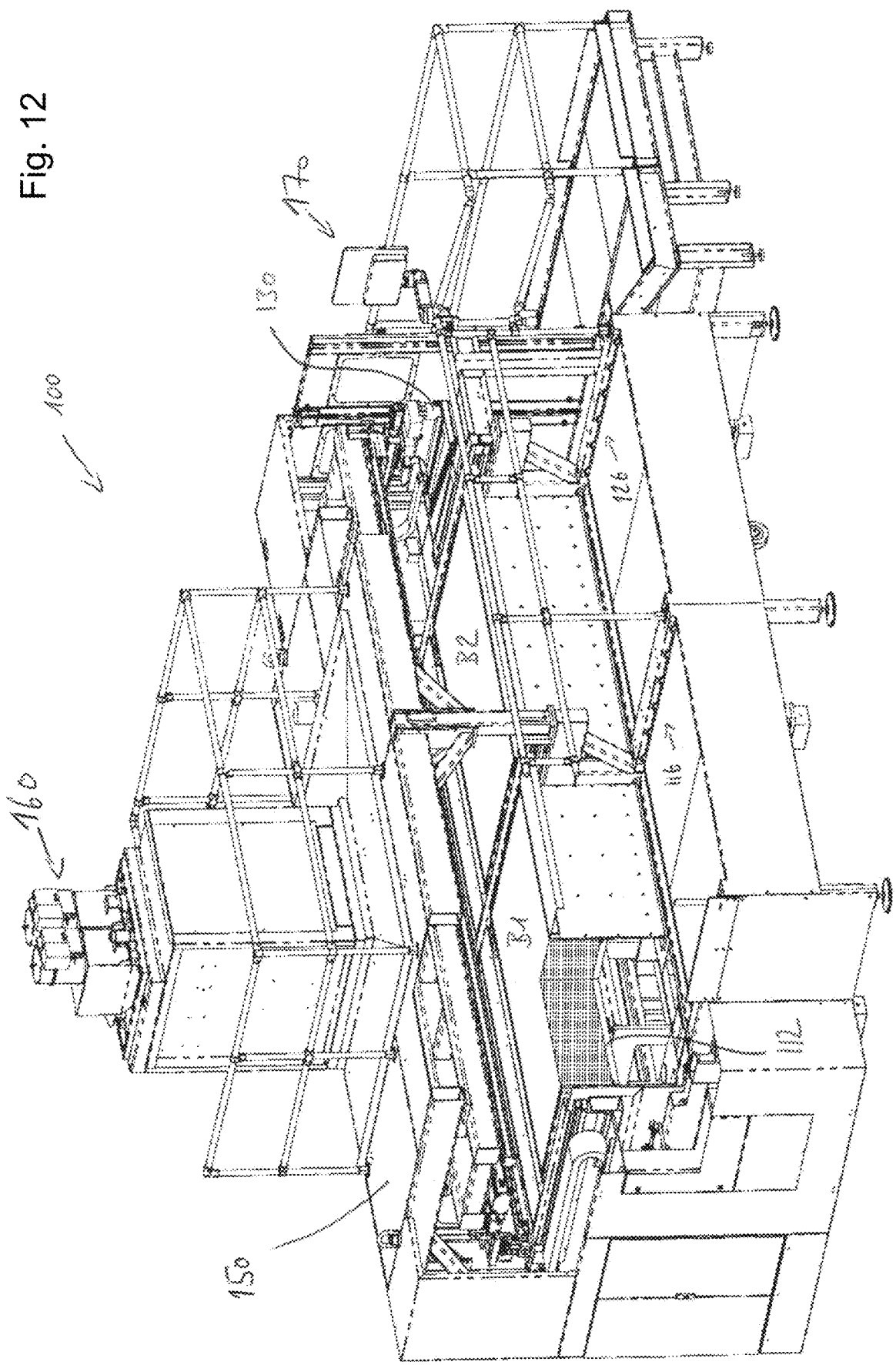

FIG. 2 shows a perspective view of a front side of the coating device arrangement according to FIG. 1, FIG. 3 shows another perspective view of the front side according to FIG. 2, FIG. 4 shows a sectional perspective view of the coating device arrangement according to FIG. 1, FIG. 5 shows a sectional perspective view of the coating device arrangement according to FIG. 1, FIG. 6 shows a cross-sectional view through the coating device arrangement of FIG. 1 at a first longitudinal position, FIG. 7 shows a cross-sectional view through the coating device arrangement according to FIG. 1 at a second longitudinal position, FIG. 8*a* shows a cross-sectional view through a coating device arrangement according to a second embodiment of the invention, the closing device being open, FIG. 8*b* shows a cross-sectional view through the coating device arrangement of FIG. 8*a*, the closing device being closed, FIG. 9 shows a cross-sectional view through a closing member for use in a coating device arrangement according to the invention in an open state of the closing member, FIG. 10 shows an enlarged portion of the lateral view according to FIG. 1, FIG. 11 shows a 3D printer according to an embodiment of the invention, the installation housing and the feeding unit having been omitted, FIG. 12 shows the 3D printer according to FIG. 11, this time with a major part of the installation housing and with the integrated feeding unit, FIGS. 13 and 14 show a top view and a perspective view from above, respectively, of a 3D printer arrangement including a first and a second 3D printer.

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figures. As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of the present invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate.

FIG. 1 shows a side view of a coating device arrangement according to a first embodiment of the invention.

By way of example, the coating device arrangement is here provided with two coating devices. It shall be understood that the coating device arrangement may alternatively be equipped with only one coating device or with more coating devices, the features described below being applicable analogously, i.e. not being limited to a coating device arrangement having two coating devices.

The coating device arrangement 1 shown herein comprises a first coating device 3 and a second coating device 5. Hereinafter, mainly the first coating device 3 will be described and the features mentioned in this connection can be applied analogously to the second coating device 5.

The first coating device 3 and the second coating device 5 may, for example, be firmly connected through a base plate 7, so that they are displaceable together across a respective construction field. In the present case, each coating device is fixed to, for example supported by the base plate 7 at one of its front sides. On the other hand, the base plate 7 can be displaceable along a linear guiding structure (not shown) which would extend perpendicular to the drawing plane in FIG. 1.

In addition, the first coating device 3 may, for example, be attached to another base plate 9 by its other front side. On the other hand, the base plate 9 may be displaceable along another linear guiding structure (not shown either). The second coating device 5 may also be fixed to another base plate (not shown) on its other front side.

As shown in FIG. 1, both coating devices 3 and 5 may, for example, be formed to be elongate, the respective longitudinal axis extending perpendicular to the direction of movement. Moreover, both coating devices 3 and 5 may be arranged one after the other in a longitudinal direction.

FIG. 2 and FIG. 3 each show a perspective view of a front side of the coating device arrangement according to FIG. 1.

As shown by FIGS. 2 and 3, the first coating device 3 may, for example, be attached to the base plate 9 through a bearing block 11 on its free front side facing away from the second coating device 5. Analogously, the coating device 3 may, for example, be fixed to the base plate 7 through another bearing block. The coating device 3 may, for example, be pivotally mounted to the respective bearing block 11. This allows for a pivoting of the coating device 3 about a horizontal pivot axis which extends parallel to the longitudinal axis of the coating device 3 to set an angle of inclination of optional stroking/sweeping members 15a and 15b attached to the coating device 3 by means of a pivot device 13. By way of example, the pivot device is here provided with a hydraulic drive 13a arranged between the bearing block and the coating device, and an electronically adjustable limit stop system 13b which variably limits the pivoting angle of the coating device to the right and to the left.

The two optional stroking members 15a and 15b are, by way of example, provided as stroking bars/strips and may, for example, be made of steel. The stroking members 15a and 15b may also be referred to as blades.

As shown in FIG. 2, the stroking members 15a and 15b form, for example, a downward oriented stroking surface which is formed to be substantially planar. A desired degree of compression of the particulate material can be set by setting the inclination angle of the respective stroking surface of the stroking members 15a and 15b. In this respect, the present coating device 3 is formed as a bidirectional coating device by way of example, which may coat in both directions, during a journey and during a return journey, and which may compress the discharged particulate material appropriately.

It shall be understood that the described coating device arrangement may also be formed as a unidirectional coating device arrangement, in which case one of the blades may be omitted. In addition, the coating device arrangement may also be configured without a pivoting coating device and/or without an adjustable blade angle.

As shown by FIGS. 4 to 7, the coating device 3 may, for example, comprise a first lower container 17, an (optional) second upper container 19 and a carrier structure.

The carrier structure may, for example, comprise one or more carriers 21a, 21b extending crosswise to the direction of movement or rather in a coating device longitudinal direction, which may be connected by several pipes or bars 21c along the coating device longitudinal direction in a transverse direction. As shown by FIG. 3, the carriers 21a, 21b may, for example, be connected to a connecting plate 21e by at least one of their front sides.

The first and second containers 17, 19 may, for example, each have an elongate shape.

By way of example, the first container 17 has a shape tapering downward in cross-section, for example a funnel shape. The first container 17 has a longitudinal slot (no reference number) at its lower end. The first container 17 may, for example, be open at its upper end, and may be connected to a lower, open end of the optional second container. For example, the first container 17 may be reinforced along the longitudinal direction by one or more reinforcing members 17c.

By way of example, the first container 17 may be provided as a shaking container, one side wall 17a (here the right side wall) of which may be exposed to a shaking movement by a shaking device 23 to vibrate particulate construction material received in the container 17.

By way of example, the first container 17 is here connected to the carrier structure by the shaking device 23 on one side (here on the right side wall 17a), and is connected to the carrier structure by a damping device 25 on the other side (here on the left side wall 17b).

The shaking device 23 may, for example comprise a shaft 23a which is connected by an eccentric 23c to a connecting rod 23b, which is connected to one side of the first container 17. Several connecting rods 23b may be provided one after another in a coating device longitudinal direction. See, for example, FIG. 10.

The damping device 25 may, for example, comprise a damping member 25b attached to the carrier structure, as well as a projecting portion 25a which is connected to or formed by the other side of the first container 17 and is supported by the damping member. For example, several damping devices 25 may be provided one after another in a coating device longitudinal direction, i.e. the first container may be connected to the carrier structure at several positions along the coating device longitudinal direction.

The (optional) second container 19 may, by way of example, have a rectangular shape in cross section. Here, the second container serves as a so-called charging container which provides the first container with construction material. A distributing member 19a, here a distributing worm may, for example, be received in the second container. The second container 19 may be rigidly connected to the carrier structure and/or may be formed/limited by the same.

In the exemplary embodiment shown, the first container and the second container are shaking motion-decoupled from each other.

It should be noted that the above-described shape/configuration and attachment of the first container and the configuration of the first container as a shaking/vibration container, the provision of a second container and the described carrier structure merely constitute optional features of the described coating device arrangement. For example, the second container may be omitted and/or a carrier structure configured otherwise may be provided. The same applies to the suspension of the optional stroking/sweeping members 15a and 15b and the closing members 31a and 31b, as described below.

As can further be seen from FIGS. 4 to 7 (also see FIG. 10), the carrier structure may, for example, comprise one or more ribs 21d for example along the coating device longitudinal direction on both sides of the container 17, which are connected to the carriers 21a and 21b, respectively, in a substantially rigid way, and to which the stroking or sweeping members 15a and 15b are attached, for example in a substantially rigid way or to be shaking motion-decoupled from the first container 17, for example using a respective bar 29a and 29b, respectively, which is, for example, fixed to the rib by a respective intermediate part (without reference number).

Above the first stroking member 15a and below the longitudinal slot, i.e. between the first stroking member 15a and the first container 17, a first closing member 31a is arranged. By way of example, this first closing member 31a is surrounded by an upper side of the first stroking member 15a in a downward direction and is, in addition, surrounded on a lateral side by the bar 29a and, in an upward direction, by the intermediate part (without reference number). The first closing member 31a is exposed in a direction perpendicular to the longitudinal direction of the coating device 3 and perpendicular to an imaginary, vertical plane through the longitudinal slot.

Analogously, a second closing member 31b is arranged above the second stroking member 15b and below the longitudinal slot, i.e. between the second stroking member 15b and the first container 17. This second closing member 31b is, by way of example, surrounded by an upper side of the second stroking member 15b in a downward direction and is, on a lateral side, surrounded by the bar 29b and, in an upward direction, by the intermediate part (without reference number). The second closing member 31b is exposed in a direction perpendicular to the longitudinal direction of the coating device 3 and perpendicular to the imaginary vertical plane through the longitudinal slot.

The respective closing member 31a, 31b may, for example, be firmly connected to the associated stroking member and/or the associated bar and/or the associated intermediate part, for example by adhesion.

The two closing members 31a and 31b which are, for example, formed to be elongate, together form a closing device 31 which is configured to selectively close the opening of the container 17 for outputting the particulate construction material. In FIG. 4 to FIG. 7, the closing members 31a and 31b are shown in their respective open state.

According to the shown exemplary embodiment, the closing members 31a and 31b may selectively cover the opening in its respective closing state in part (for example following a lateral expansion of the respective closing member), so that the closing members 31a and 31b close the opening together.

As shown, the first closing member 31a and the second closing member 31b may, for example, comprise a first and a second hollow body, respectively, wherein each of the two hollow bodies has an inner cavity which is limited by a deformable portion, wherein the two hollow bodies are arranged on opposite sides of the opening in such a way that the deformable portions face each other, wherein each of the two deformable portions is configured to be deformed by a pressure fluid supplied to the associated hollow body, thereby expanding the inner cavity, so that the two deformable portions may be moved toward each other and may be brought into contact with each other, to thereby close the opening.

The deformable portions may, for example, be formed by the above-described lateral free portion of the respective closing member.

A closing member configured in such a way may, for example, also be referred to as an inflatable sealing member according to different embodiments.

It goes without saying that only one closing member 31a may be provided in an exemplary modification of the embodiment shown instead of the two closing members 31a and 31b, which one closing member 31 covers the opening entirely in the closed state of the closing device. Moreover, the closing device may, as a further alternative, comprise one or more sliders/slide valves.

It should also be noted that the coating device arrangement shown in FIG. 1 may comprise a separate closing device for each of the coating devices 3 and 5, so that the opening of a respective coating device can be closed independently and selectively.

In a case where the coating device 3 is provided together with the coating device 5, the coating device, the construction job of which is finished first may be closed by means of its associated closing device, for example at least until the construction job of the other coating device is finished.

Hereinafter and with reference to FIGS. 8a, 8b and 9, a coating device arrangement according to a second embodiment of the invention is described.

As illustrated by FIGS. 8a and 8b, the coating device arrangement 1 has a coating device 3 with a container 17 defining an inner cavity for receiving particulate construction material, which leads into an opening for outputting the particulate construction material, as well as a closing device 31 which is configured to selectively close the opening for outputting the particulate construction material.

As shown, the closing device 31 may comprise at least one (here, by way of example two) closing member 31a, 31b attached to the coating device 3, which is configured to selectively cover the opening at least in part, for example as a result of a lateral movement and/or deformation, such as a lateral expansion.

As illustrated by FIGS. 8a and 8b, the at least one closing member 31a, 31b may, for example, be arranged underneath the opening, for example at a vertical distance thereto, and/or at least one (here, by way of example two) stroking member 15a, 15b may, for example, be attached to the coating device 3, which is configured to stroke construction material output from the opening, to thereby level and/or compress the output particulate material, wherein the at least one closing member 31a, 31b is arranged above the at least one stroking member.

Here, the at least one closing member 31a, 31b or at least the later described deformable portion thereof is, by way of example, made of a flexible elastic silicone material and comprises a sealing surface configured to seal at a counter surface in a closing state of the closing device. In this respect, the sealing surface is formed at the deformable portion which will be described below. According to the embodiment shown, the counter surface is also formed by a deformable portion.

As illustrated by FIGS. 8a, 8b and 9, the first closing member 31a and the second closing member 31b may, for example, comprise a first and a second hollow body, respectively, wherein each of the two hollow bodies has an inner cavity 33 (see FIG. 9) which is limited by a deformable portion 35, wherein the two hollow bodies are arranged on opposite sides of the opening in such a way (see FIG. 8a) that the deformable portions face each other, and wherein each of the two hollow bodies is configured to be deformed in an outward direction by an introduced pressure fluid at the deformable portion, thereby expanding the inner cavity, so that the two deformable portions may be moved toward each other and may be brought into contact with each other, to thereby close the opening (see FIG. 8b). As illustrated by FIG. 8b, each of the two closing members 31a, 31b partially covers the opening in this context.

As illustrated by FIGS. 8a, 8b and 9, the deformable portion 35 may, for example, be inwardly curved with the opening being uncovered, and may bend/curve outwardly by a pressure fluid supplied to the hollow body to close the opening.

As suggested by FIGS. 8a and 8b, the closing device 31 may, for example, further comprise a fluid line structure F (broken line) through which the respective closing member 31a, 31b is in fluid connection with a pressure fluid source.

The fluid line structure F may, for example, be formed as a hose line structure, for example as a drag hose line structure, at least in sections. The hose line structure may comprise first and second hose lines Fa and Fb, respectively, wherein the respective hose line may for example be connected to the associated closing member 31a, 31b at a front side thereof.

Here, the pressure fluid source exemplarily comprises a compressed air vessel P which is, for example, formed as a stationary vessel, and a valve V which may, for example, be mounted on the fluid line F between the compressed air vessel P and the closing members.

As further suggested by FIGS. 8a and 8b, the closing device 31 may, for example, further comprise a control unit C which is configured to selectively close the opening by means of the at least one closing member 31a, 31b in a controlled way.

In this respect, the control unit exemplarily is connected to the valve V and is configured to control it for closing the opening in such a way that the pressure fluid source feeds pressure fluid into the at least one hollow body 31a, so that it is deformed at its deformable portion 35, to thereby close the opening.

In FIG. 8a the valve is closed (and consequently the closing device is opened), whereas in FIG. 8b the valve is open (and consequently the closing device is closed).

The control unit C may, for example, be configured to close the closing device 31 if the construction job assigned to the coating device 3 is finished and/or interrupted, and/or to close the closing device 31 of the coating device 3 at least temporarily during a coating-free journey and/or during a coating-free travel phase, for example during an advance and/or follow-up travel phase, and/or close the closing device 31 of the coating device in a standstill position of the coating device 3, and/or close the closing device 31 of the coating device 3 at least temporarily for cleaning the coating device.

As in the first embodiment, an optional second coating device may be provided for example in this embodiment as well. This second coating device may, for example, comprise a separate closing device which is driven by the control unit analogously to the first closing device.

FIG. 11 shows a 3D printer 100 according to an embodiment of the invention, where the installation housing is not shown, so that the installation frame 140 can be seen.

As shown by FIG. 11, the above-described coating device arrangement 1 according to the first embodiment and/or the second embodiment may, for example, be employed in a 3D printer 100. In this context, reference number 103 shows a linear guiding structure for the at least one coating device 3.

The 3D printer 100 may, for example, comprise a printing device having a print head 130 in addition to the coating device arrangement 1 (here by way of example comprising first and second coating devices 3, 5), which is configured to print a treatment agent on a predetermined partial area of a previously applied layer of construction material.

The print head 130 may, for example, be displaceable horizontally, for example in a direction perpendicular to the direction in which the at least one coating device 3, 5 is displaceable, for example along a first print head linear guiding structure 131.

In this respect, the print head 130 may for example be configured to serve several (here two) construction fields.

The print head 130 may, for example, be additionally displaceable in the direction in which the at least one coating device 3, 5 is displaceable as well, so that it may travel across the construction field or the construction fields altogether in a meandering course, for example in the shape of a U. For this purpose, the print head 130 may, for example, be displaceable along a second print head linear guiding structure 132.

As an alternative to the printing device, a respective construction material layer may, for example, be solidified selectively, for example sintered, using a laser (so-called "selective laser sintering").

As illustrated by FIG. 11 (also see FIG. 12), the 3D printer 100 may, for example, comprise one or more construction areas B1 and B2 (here exemplarily two) which are for example defined by a respective construction platform 112 (see FIG. 12) and/or a respective construction box 110 and 120, respectively, if the latter is located within the 3D printer in its construction position.

The respective construction platform 112 may, for example, be height-adjustable using an associated lift drive (here exemplarily using an installation-fixed lift drive 114).

As shown, the first construction box 110 may be displaceable for example through a first roller conveyor 116 into and out of the 3D printer, and the second construction box 120 may be displaceable for example through a second roller conveyor 126 into and out of the 3D printer.

FIG. 12 shows the 3D printer 100 of FIG. 11, this time with a large part of the installation housing 150 and with an integrated coating device feeding unit 160.

As shown in FIG. 12, the 3D printer 100 may, for example, further comprise a coating device feeding unit 160 integrated in the 3D printer, by means of which construction material can be freshly prepared and fed into the (respective) coating device.

Two storage containers are illustrated, which store a respective particulate material and may feed the latter in a dosed manner into a mixing container having a stirring unit which cannot be seen.

A part of the installation housing 150 and of the first construction box 100 is omitted in FIG. 12 to make the construction platform 112 and the stack of construction material layers arranged thereon visible.

The coating devices 3, 5 are displaced backwards in FIG. 12, and the print head 130 is located in the front on the right-hand side.

FIG. 12 further shows how a first construction area B1 and a second construction area B2 are respectively formed by the first construction box and the second construction box in the 3D printer.

Reference number 170 shows a shared operating station. Reference numbers 116 and 126 indicate a respective feeding device, here exemplarily in the form of a roller conveyor, by means of which a respective construction box can be moved to its construction box construction position within the 3D printer.

FIGS. 13 and 14 show a plan view and a perspective view from above, respectively, of a 3D printer arrangement 200 which comprises first and second 3D printers 100 and 100', respectively.

Both 3D printers may, for example, be configured like the 3D printer 100 described with reference to FIGS. 11 and 12.

As illustrated by FIGS. 13 and 14, the first and second 3D printers 100, 100' may be arranged adjacent to each other in such a way that the introduction openings for introducing the construction boxes are opposite each other. A rail system 210 may for example extend between the two 3D printers, along which a common transportation device 220 is displaceable. The transportation device 220 may be used both by the first and the second 3D printer 100, 100' to equip the respective 3D printer with one or more construction boxes.

In addition, one or more optional components may be arranged along the rail system, for example a construction box stock 230 in which one or more construction boxes are held available, and/or a microwave oven 240 which may receive a construction box to (further) solidify a component contained therein, and/or an unpacking station 250 where a component contained in the construction box can be freed from loose, unsolidified particulate material and thus can be "unpacked", for example in an automated manner. In this context, reference number 260 indicates an optional component stock into which unpacked components (here for example casting molds and/or foundry cores) manufactured by means of a generative manufacturing process using one of the two 3D printers can be placed into storage.

According to a further embodiment, a first construction job may be carried out in a first construction area and at the same time, i.e. concurrently, a second construction job may be effected in a second construction area in a generative manufacturing process—for example using a 3D printer configured as described above and/or using a coating device arrangement configured as described above—, wherein the first construction area is served by a first coating device and the second construction area is served by a second coating device, wherein the first and second coating devices are, for example moved across the first and the second construction area together, and wherein, upon termination of the first construction job, an output opening for outputting construction material of the first coating device is closed by means of a closing device. In this respect, the first construction job may, for example, be less time-consuming than the second construction job.

According to another embodiment, a coating device may be moved across an associated construction area repeatedly in a generative manufacturing process—for example using a 3D printer configured as described above and/or using a coating device arrangement configured as described above—, in order to output particulate construction material in the form of a uniform layer onto the construction area, wherein an output opening of the coating device is closed at least temporarily by means of a closing device attached to the coating device, during a coating-free journey, for example during a coating-free return journey of a unidirectional coating device, and/or during a coating-free travel phase, for example an advance and/or follow-up travel phase, and/or in a standstill position of the coating device, and/or upon/after termination and/or interruption of a construction job, and/or for cleaning the coating device.

According to another embodiment, a coating device of a 3D printer may be displaced to a cleaning station in a coating device cleaning method process—for example using a 3D printer configured as described above and/or using a coating device arrangement configured as described above—, in order to clean the coating device, wherein an output opening of the coating device is closed during a cleaning process of the coating device, for example of a stroking/sweeping member thereof, at least temporarily by means of a closing device attached to the coating device.

For this purpose, the 3D printer may, for example, comprise an integrated cleaning station in which the coating device, for example the at least one stroking member thereof, may be brushed. Otherwise, the 3D printer may, for example, be configured as described above.

The invention claimed is:

1. A coating device arrangement (1) for a 3D printer (100), comprising:

a coating device (3) having a container (17) which is formed to be elongate and which defines an inner cavity for receiving particulate construction material, which leads to an opening for outputting the particulate construction material, which is formed as an elongate slot, and a closing device (31) configured to selectively close the opening for outputting the particulate construction material, wherein the closing device (31) comprises at least one closing member (31*a*) attached to the coating device (3), which is elongate in shape and which is configured to selectively cover the opening at least in part as a result of a lateral movement and/or deformation, characterized in that the at least one closing member (31*a*) is formed by a hollow body, the inner cavity (33) of which is limited by a deformable portion (35), the hollow body being configured to be deformed outward by a pressure fluid supplied to the hollow body, thereby expanding the inner cavity, to thereby cover the opening at least in part, and wherein the coating device (3) further comprises at least one stroking member (15*a*) which is configured to stroke construction material output from the opening, to thereby level and/or compress the output particulate material, and the at least one closing member (31*a*) is arranged above the at least one stroking member, wherein the at least one stroking member (15*a*) is attached to the coating device (3) in a substantially rigid way and wherein the at least one closing member (31*a*) is attached to an upper side of the at least one stroking member (15*a*).

2. A coating device arrangement (1) according to claim 1, wherein the coating device (3) is displaceable in a horizontal direction and the longitudinal axis of the container (17) and/or the longitudinal axis of the longitudinal slot extend in a horizontal direction which is perpendicular to the direction in which the coating device (3) is displaceable, and/or wherein the longitudinal axis of the at least one closing member (31*a*) extends substantially parallel to the longitudinal extension of the slot, and the at least one closing member (31*a*) is displaceable and/or deformable and/or expandable perpendicularly to its longitudinal axis.

3. A coating device arrangement (1) according to claim 1 wherein the at least one closing member (31*a*) is arranged underneath the opening.

4. A coating device arrangement (1) according to claim 1 wherein the at least one closing member (31*a*) comprises a sealing surface configured to seal on a counter surface in a closing state of the closing device, and wherein the sealing surface is made of a flexible material.

5. A coating device arrangement (1) according to claim 1 wherein the closing device (31) comprises a first and a second hollow body (31*a*, 31*b*), wherein each of the two hollow bodies has an inner cavity (33) which is limited by a deformable portion (35), and wherein the two hollow bodies are arranged on opposite sides of the opening in such a way that the deformable portions face each other, and wherein each of the two hollow bodies is configured to be deformed outward at the deformable portion by a supplied pressure fluid, thereby expanding the inner cavity, so that the two deformable portions can be moved toward each other and can be brought into contact, to thereby close the opening.

6. A coating device arrangement (1) according to claim 1 wherein the deformable portion (35) is inwardly curved with the opening being uncovered, and is able to curve outwardly by a pressure fluid supplied to the hollow body to close the opening.

7. A coating device arrangement (1) according to claim 1 wherein the closing device (31) further comprises a fluid line structure (F) through which the respective hollow body (31a) is in fluid connection with a pressure fluid source (P, V).

8. Coating device arrangement (1) according to claim 7 wherein the closing device (31) further comprises a control unit (C) configured to selectively close the opening in a controlled way by means of the at least one closing member (31a), wherein optionally the control unit (C) is connected to the pressure fluid source (P, V) and is configured to control it for closing the opening in such a way that the pressure fluid source supplies pressure fluid into the hollow body (31a), so that the hollow body is deformed at its deformable portion (35).

9. A coating device arrangement (1) according to claim 1 having a plurality of coating devices (3, 5) and a corresponding plurality of closing devices, so that the opening of a respective coating device can be closed independently and selectively, wherein the coating devices (3, 5) are movable across a respectively associated construction field together.

10. A coating device arrangement (1) according to claim 9 further comprising a control unit (C) which is configured to close the closing device (31) if the construction job assigned to the coating device (3) is finished and/or interrupted, and/or to close the opening of the coating device amongst the coating devices (3, 5), the construction job of which is finished first by means of its associated closing device, and/or to close the closing device (31) of the coating device (3) during a coating-free journey, and/or to close the closing device (31) of the coating device (3) during a coating-free travel phase, and/or to close the closing device (31) of the coating device in a standstill position of the coating device (3), and/or to close the closing device (31) of the coating device (3) for cleaning the coating device.

* * * * *